United States Patent [19]

[11] 3,715,495

[45] Feb. 6, 1973

Takezaki et al.

[54] SIGNAL SEEKING TYPE AUTO-TUNING TELEVISION RECEIVER

[75] Inventors: Tsuneo Takezaki, Neyagawa; Sukeichi Miki, Hirakata, both of Japan

[73] Assignee: Matsushita Electric Industrial Co., Ltd., Osaka, Japan

[22] Filed: Feb. 26, 1971

[21] Appl. No.: 119,136

[52] U.S. Cl. ..............178/5.8 A, 325/471, 331/36 C, 334/15, 334/20

[51] Int. Cl. ..............................................H04n 5/62

[58] Field of Search ..............178/5.8 A, 5.8 R, 5.8 F; 325/471; 334/15, 20; 331/36 C, 177 U

[56] References Cited

UNITED STATES PATENTS

| | | | |
|---|---|---|---|
| 3,130,264 | 4/1964 | Dietz | 178/5.8 R |
| 3,526,859 | 9/1970 | Putzer | 334/15 |
| 3,553,379 | 1/1971 | Boomgaard | 325/470 |
| 3,096,397 | 7/1963 | Stachowiak et al. | 178/5.8 R |
| 3,564,423 | 2/1971 | Putzer | 334/15 |
| 2,898,400 | 8/1959 | Parmet et al. | 178/5.8 R |

*Primary Examiner*—Robert L. Griffin
*Assistant Examiner*—Donald E. Stout
*Attorney*—Wenderoth, Lind & Ponack

[57] ABSTRACT

A signal seeking type auto-tuning television receiver including a tuning means which has a reversely biased voltage variable capacitance diode, a main detecting means which comprises a limiter with a filtering circuit and a frequency discriminator for detecting sound IF carrier signals and developing a main control signal, a subsidiary detecting means which comprises a tuned amplifier, a transistor detector and a rectifier for detecting picture IF carrier signals and developing a subsidiary control signal, and a scanning means coupled to the tuning means to supply a sweep voltage to the voltage variable capacitance diode and controlled by the main and subsidiary control signals so as to stop when a desired television signal is received and so as not to stop when undesired noises are detected.

7 Claims, 12 Drawing Figures

PATENTED FEB 6 1973

3,715,495

INVENTORS
TSUNEO TAKAZAKI
SUKEICHI MIKI

BY Wenderoth, Lind & Ponack
ATTORNEYS

INVENTORS
TSUNEO TAKAZAKI
SUKEICHI MIKI

BY Wenderoth, Lind & Ponack
ATTORNEYS

INVENTORS
TSUNEO TAKAZAKI
SUKEICHI MIKI

BY Wenderoth, Lind & Ponack
ATTORNEYS

INVENTORS
TSUNEO TAKAZAKI
SUKEICHI MIKI

BY Wenderoth, Lind & Ponack
ATTORNEYS

SIGNAL SEEKING TYPE AUTO-TUNING TELEVISION RECEIVER

This invention relates to a signal seeking type autotuning television receiver system using a reversely biased voltage variable capacitance diode and an electro-mechanical driving means for changing said bias voltage.

Several signal-seeking tuning systems for TV receivers have been proposed heretofore, which systems use continuously variable tuning elements such as variable air-capacitors or variable capacitance diodes in the tuning means, electromechanical driving means or electronic sweeping means by which the reactances of the tuning elements are continuously varied for scanning the frequency spectrum, and a signal detecting means to detect the presence of a signal being received and to stop the driving means or the sweeping means when the continuously variable tuning elements are tuned to the desirable received TV signals.

Tuning systems of this type have the capability of easy and all channel selection in both the VHF and UHF bands.

But conventional signal seeking type auto-tuning television receivers are apt to cease their signal seeking action and cause the production of an undesirable picture and sound upon a reception of a noise signal, such as an image signal, a city noise, a pulse noise produced by a motor, and so on. They also have another undesired receiving condition, that in which they receive only one carrier signal of two carriers, i.e. the picture or the sound carrier, instead of the signals of two carriers, i.e. the picture and the sound carrier, and stopping the signal-seeking action when this one carrier signal is received.

Accordingly, it is an object of this invention to provide an improved signal seeking system for TV receivers.

It is another object of this invention to provide an improved signal seeking system which distinguishes between picture and sound carriers by an innovative circuit arrangement, and converts picture and sound carriers to respective picture and sound IF signals correctly positioned within a predetermined IF bandpass characteristic so as to properly tune in a desired TV signal.

It is a further noted object of this invention to provide an improved signal seeking system which distinguishes between desired TV signals and undesirable noise or image signals and receives only desired TV signals.

In accordance with this invention, an auto-tuning television receiver is provided which includes a main signal detecting circuit means and a subsidiary detecting circuit means. The main signal detecting circuit means is coupled to an intermediate frequency amplifier and detects an IF carrier signal which is at a predetermined frequency at which a sound IF carrier signal is to be present, so that it normally detects a sound IF carrier signal. The subsidiary detecting circuit means is also coupled to the intermediate frequency amplifier and detects the presence of a picture IF carrier signal.

In one embodiment of this invention, said main signal detecting circuit means comprises a tuned amplifier which is tuned at the sound IF carrier frequency and which also acts as a limiter and a frequency discriminator. The subsidiary signal detecting circuit means comprises a tuned amplifier which is sharply tuned at the picture IF carrier frequency, an AM detector and a synchronizing signal separator.

Furthermore, the auto-tuning television receiver system according to this invention includes a gate circuit means which is actuated by a subsidiary control signal to control a control circuit means. The subsidiary control signal is developed in the subsidiary detecting circuit means.

Further objects, novel features, and attending advantages of this invention will be pointed out in the following description and claims, and illustrated in the accompanying drawings which disclose, by way of example, the principle of the invention and the best mode which has been contemplated of applying that principle.

In the drawings:

FIG. 1 is a schematic circuit diagram, partly in block form, of an auto-tuning television receiver system in accordance with this invention, wherein some portions similar to the conventional television receiver system are omitted, for example, a C.R.T., a depletion circuit, etc., since these omitted portions do not play any part in the signal seeking function of the system according to the invention;

Figure 5A:
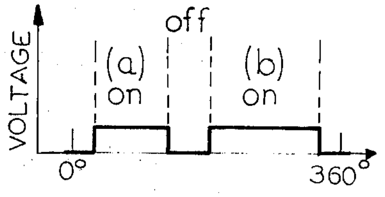
Figure 5B:
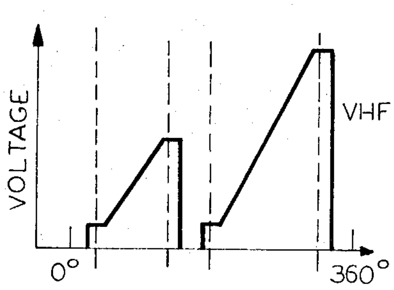
Figure 5C:
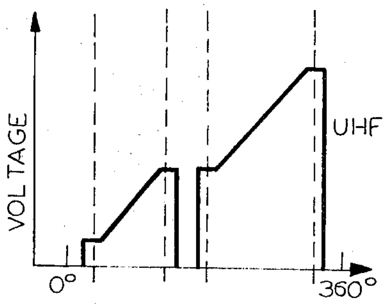
Figure 5D:
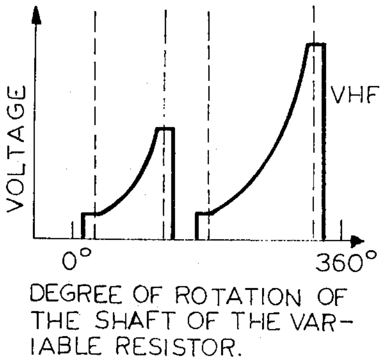
Figure 6A:
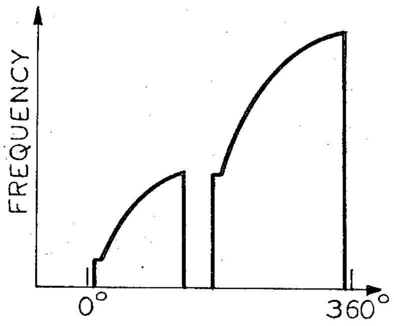
Figure 6B:
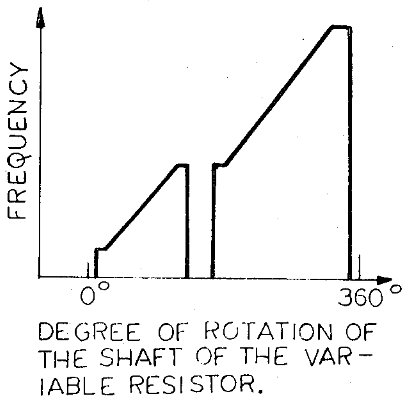

FIGS. 5A–5D are graphs explaining the operation of the scanning circuit means including the variable resistor and the switching means in one embodiment of the invention, FIG. 5A showing the relationship between the state of the switching means and the rotational position of a contact of the variable resistor, FIG. 5B and FIG. 5C showing the relationships between the output voltages and the rotational positions for the VHF band and the UHF band, respectively, of the contacts of the variable resistor, and FIG. 5D also showing the relationship between the output voltage and the rotational position of the contact of the variable resistor in the further improved scanning circuit means; and FIGS. 6A and 6B are graphs showing the relationships between the tuned frequency of the receiver and the rotational position of the contact of the variable resistor, FIG. 6A being for a conventional receiver and FIG. 6B being for the improved receiver of the present invention.

Figure 1:
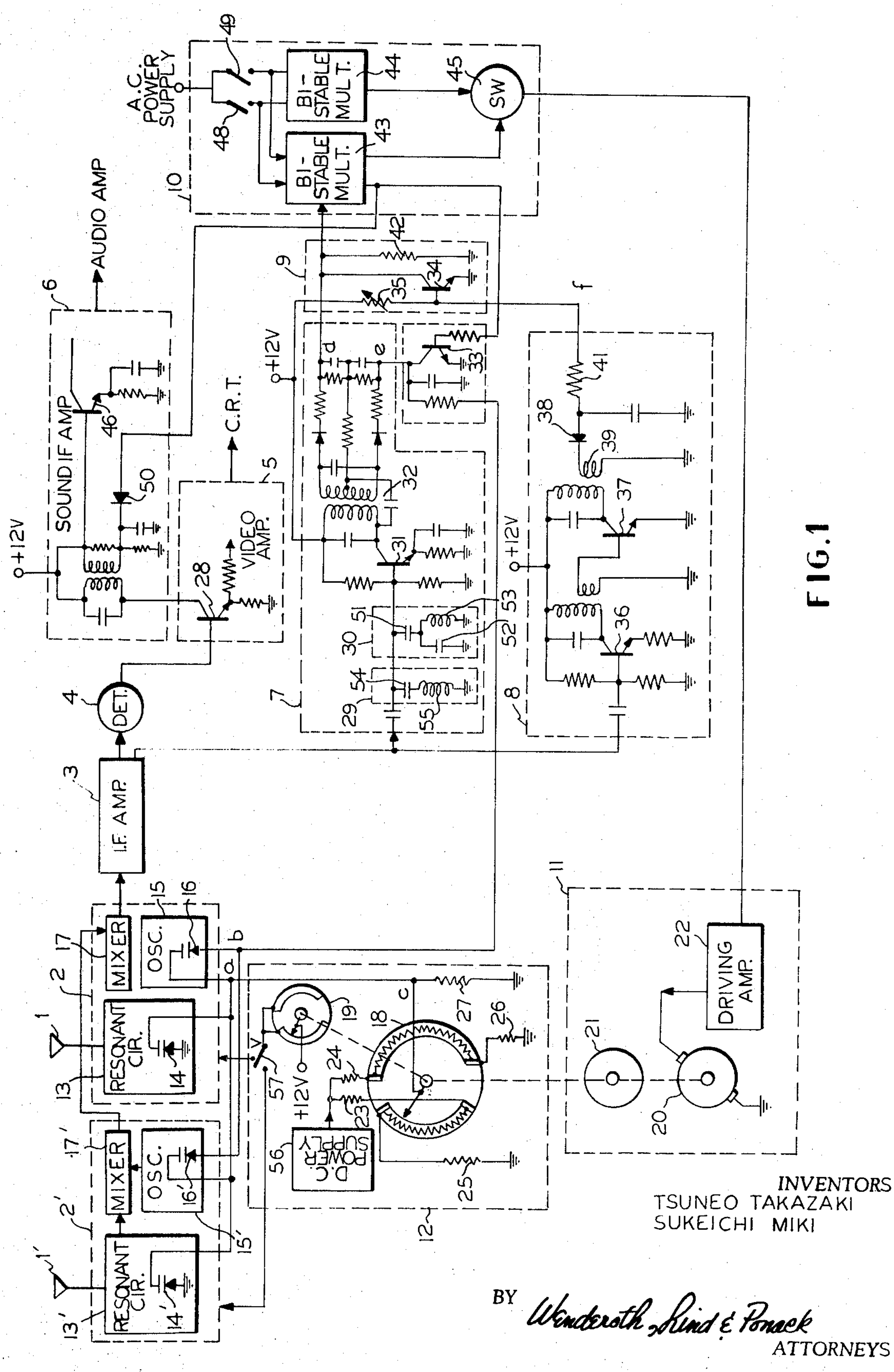

Now referring to FIG. 1, which is a schematic circuit diagram for an all channel television receiver, an antenna 1 and a tuner 2 are provided for VHF band tuning, and an antenna 1′ and a tuner 2′ are provided for UHF band tuning.

Television signals in a VHF band intercepted by the antenna 1 are supplied to the tuner 2. The tuner 2 comprises a resonant circuit 13, a local oscillator 15 and a mixer circuit 17. The resonant frequency of the resonant circuit 13 is governed by a voltage variable capacitance diode 14 and the oscillatory frequency of the local oscillator 15 is governed by a variable capacitance diode 16. The mixer circuit 17, which is coupled both to the resonant circuit 13 and the local oscillator 15, mixes the received TV signal and the output signal of the local oscillator so as to provide an intermediate frequency component.

The scanning circuit means 12 comprises a DC power supply 56, a variable resistor 18 and a switching means 19, and it reversely biases the voltage variable capacitance diodes 14 and 16.

The functions of the parts of the receiver for UHF band tuning are designated by primed reference numbers, that is, the antenna 1′, resonant circuit 13′, mixer 17′, local oscillator 15′, and voltage capacitance diodes 14′ and 16′, and are similar to the corresponding parts for VHF band tuning, respectively; that is, the antenna 1, the resonant circuit 13, the mixer 17, the local oscillator 15 and the voltage capacitance diodes 14 and 16. The tuner 1 and the tuner 1′ are selectively actuated by a band selection switch 57.

The variable resistor 18 and the switching means 19 are ganged so as to be moved together and are driven by a driving means 11. The driving means 11 comprises a motor 20, a gear 21, and a driving amplifier 22.

In the scanning circuit means 12, the variable resistor 18 is coupled to the D.C. power supply 56 through biasing resistors 23 and 24, and is grounded through other biasing resistors 25 and 26, so that a terminal (c) of the variable resistor 18 is supplied with the voltage for biasing the variable capacitance diodes 14 and 16.

A resistor 27 is connected between the terminal (c) and the ground, and the function thereof will be described in detail hereinafter, in relation to the description of the structure and operation of the variable resistor 18 and the switching means 19.

The intermediate frequency signals are amplified by an intermediate frequency amplifier 3 and detected by a video detector 4. The output signal of the detector 4 includes a video signal, and it is amplified by a video amplifier 5 and supplied to a C.R.T. (which is not shown in FIG. 1).

An intercarrier sound signal which is produced by the interaction of the picture and the sound intermediate frequency signals is also amplified by an amplifier 28 within the video amplifier 5 and then supplied to a sound intermediate frequency amplifier 6.

Further, the amplified sound IF output of the amplifier 6 is detected and fed to a speaker through an audio amplifier. In FIG. 1 the following means and their connections in a conventional TV receiver are not shown; i.e., a cathode ray tube, an audio amplifier, a speaker, a deflection control circuit, a synchronizing signal separator, a power supply circuit, chromatic control circuits in the case of a color TV, etc., because they are not directly related to the subject matter of the invention.

The composite video IF carrier signal from the intermediate frequency amplifier 3 is also supplied to the main signal detecting circuit means 7. The main signal detecting circuit means 7 includes two filters 29 and 30, a tuned amplifier 31 and a discriminator 32. The two filters 29 and 30 will be described in detail hereinafter. The tuned amplifier 31 has a resonant circuit which is tuned, for example, to a frequency of 41.25 MHz, which is the predetermined proper intermediate frequency of the sound carrier signal for the present TV receivers in the U.S.A.

The tuned amplifier 31 also functions as a limiter when the input signal has a large amplitude.

The discriminator 32 has a resonant circuit tuned to 41.25 MHz and two output terminals (d) and (e) balanced to the ground. The terminal (e) is connected to a terminal of the voltage variable capacitance diode 16 included in the local oscillator 15 through an electric switching circuit means 33 for providing an automatic frequency control action. The other terminal (d) of the discriminator 32 is supplied with a main control signal from the main signal detecting circuit 7 and it is connected to a gate circuit means 9.

A portion of the output composite video IF carrier signal from the intermediate frequency amplifier 3 is also applied to a subsidiary signal detecting circuit means 8.

The subsidiary signal detecting circuit means 8 includes a tuned amplifier 36, a detector 37, and a rectifier circuit means 38 connected in this order. The tuned amplifier 36 has a resonant circuit which is sharply tuned to a frequency of 45.75 MHz, which is the predetermined proper intermediate frequency of the picture carrier signal for the present TV receivers in the U.S.A. The detector 37 has a resonant circuit tuned to 15.750 KHz, corresponding to the frequency of the horizontal synchronizing pulse.

The horizontal synchronizing signal pulse is rectified and smoothed by the rectifier circuit means 38 which includes a diode 39 and a smoothing condensor 40.

Therefore, when the picture IF carrier signal is provided at the input of the subsidiary signal detecting means 8, a negative voltage (i.e. subsidiary control signal) appears at terminal (f) through a resistor 41.

The gate circuit means 9 comprises a switching transistor 34, a variable resistor 35 for determining a switching level, and a resistor 42.

The collector of the transistor 34 is connected to both the output terminal (d) of the discriminator 32 and an input terminal of a control circuit means 10. The emitter of the transistor 34 is grounded and the base is connected to both the output terminal of the subsidiary signal detecting means 8 and to the D.C. power supply through a variable resistor 35. The switching transistor 34 is normally in the "on" state, because the base is sufficiently biased through the variable resistor 35. But, when sufficient negative output voltage is supplied to the base of the transistor 34 from the output of the rectifier circuit means 38, the switching transistor 34 is switched to the "off" state, and the main control signal from the main signal detecting means 7 is fed to the control circuit means 10.

The control circuit means 10 comprises a first bistable multivibrator 43, a second bistable multivibrator 44, a switching circuit means 45 and mechanical switches 48 and 49 which are actuated by a viewer.

The switching circuit means 45 is connected in parallel with the second bistable multivibrator 44. Upon being actuated by the output voltage of the first multivibrator 43, the switching circuit means 45 controls an output signal flow of the second multivibrator 44.

The state of the first bistable multivibrator 43 is changed by the mechanical switch 48 or 49 and the output voltage of the main signal detecting circuit means 7. When the mechanical switch 48 or 49 is pushed, the first bistable multivibrator 43 causes the switching circuit means 45 to open so as to complete the signal flow path from the second bistable multivibrator 44, and at the same time it actuates the electronic switching circuit means 33 so as to stop the automatic frequency control action. When the output voltage of the main signal detecting circuit 7 appears, the first bistable multivibrator 43 is changed to the other stable state, and it reverses the state of the switching circuit means 45 and 33 to cause the receiver to receive the desired television signal.

The stable state of the second bistable multivibrator 44 is determined by the mechanical switching means 48 and 49, which determines the direction of rotation of the motor 20 or the direction of tuning. For example, if the switch 48 is pushed, the output voltage of the second bistable multivibrator 44 is applied to the driving amplifier 22 through the switching circuit means 45. Then, the output signal of the driving amplifier 22 actuates the motor 20 and thus actuates the scanning circuit means 12 in the normal direction, i.e. from the low to the high tuning frequencies within a television band.

The driving means 11 comprises the driving amplifier 22, the motor 20 and the gear 21. The motor 20 is connected to the driving amplifier 22 and is supplied with a voltage therefrom. The polarity of the voltage is determined by the second bistable multivibrator 44. The gear 21 is ganged mechanically with the motor 20 so as to transmit the rotation of the motor 20 to the shaft of the variable resistor 18 in the scanning circuit means 12 while reducing the speed of the rotation.

In the auto-tuning television receiver system in accordance with the invention, the driving means is stopped by the two control signals from the main and subsidiary signal detecting circuit means 8 and 9, i.e. the main and subsidiary control signals. The main control signal is supplied from the discriminator 32, wherein a part of the signal having a frequency of 41.25 MHz from the IF amplifier 3 is amplified and limited by the tuned amplifier 31 before it is applied to the discriminator 32. Therefore, it is very seldom that the main control signal is erroneously provided just because of the presence of any undesirable noise, such as a city noise, a motor noise, or the noise produced at the time of starting and finishing scanning through the TV band. But, the main control signal is developed by the presence of either the picture or the sound IF carrier signal at the frequency of 41.25 MHz during the scanning of the frequency spectrum.

However, in the subsidiary detecting circuit means 8, it is only when the electric waves containing the synchronizing signal come in that a subsidiary control signal is developed by the transistor detector 37 having the resonant circuit tuned to the horizontal synchronizing signal frequency 15.75 KHz. Accordingly, it is only when the presence of the picture IF carrier signal very nearly at the predetermined frequency (45.75 MHz in the case of present TV receivers in the U.S.A.) is detected that the subsidiary control signal is developed.

The gate circuit 34 is opened by the subsidiary control signal, and only then is the main control signal applied to the first bistable multivibrator 43.

Accordingly, the trigger signal to the first bistable multivibrator 43 is developed only when the picture IF carrier signal is very nearly at the predetermined frequency of 45.75 MHz and when the sound IF carrier signal is very nearly at the predetermined frequency of 41.25 MHz.

Therefore, the signal seeking action of the tuning means 2 is stopped only when the picture and sound carrier signals are correctly positioned within the predetermined bandpass characteristic of the IF amplifier 3, and is not stopped when only one of the picture or sound intermediate frequency carrier signals is within the bandpass characteristic of the IF amplifier. The action is also not stopped when the tuning means receives an image of a TV signal, because the frequency relationship of the sound and picture carrier IF signals is reversed from the correct relationship.

In FIG. 1, the main signal detecting means 7 includes the filter 30 coupled to the IF amplifier 3 and the tuned amplifier 31, and the filter 30 includes a capacitor 51. One terminal of the capacitor 51 is connected to both the input terminal of the tuned amplifier 31 and to the IF amplifier 3, and the other terminal is grounded through an inductance coil 53 and a capacitor 52 connected in parallel. The resonant frequency of the filter 30, which is determiend by the inductance of the coil 53 and the total capacitance of the capacitor 51 and capacitor 52 is set so that it is about 1 MHz away from the center frequency of the discriminator 32. The antiresonant frequency which is determiend by the inductance of the coil 53 and the capacitance of the capacitor 52 is set so that it is between the above resonant frequency and the center frequency of the discriminator, for developing a sharp main control signal.

Figure 2A:
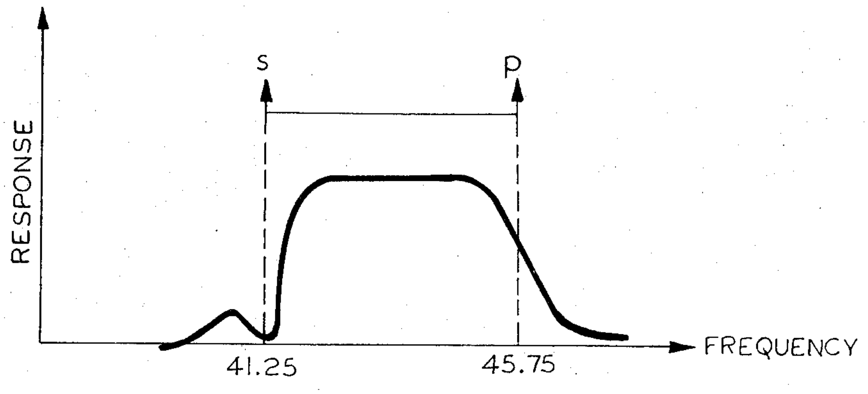
FIG. 2A is a graph showing the IF amplifier bandpass characteristic of a typical television receiver.
Figure 2B:
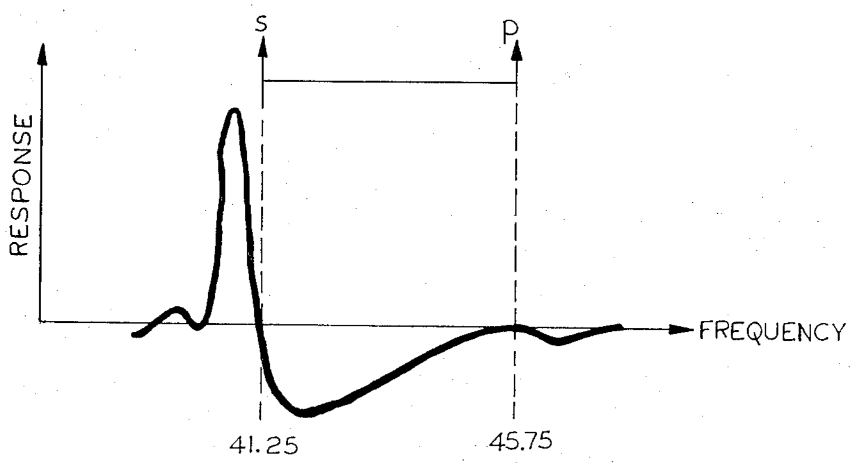
FIG. 2B is a graph showing the output frequency characteristic of a main signal detecting circuit means.

With these connections of the filter 30, the frequency characteristic of the main signal detecting circuit means 7 is as illustrated in the left-hand portion of FIG. 2B. Accordingly, the main control signal becomes very sharp when developed during scanning of the frequencies and therefore the tuning means is stopped very nearly at the correct position when a desired TV signal is being received.

Furthermore, use of this filter 30 provides the advantage of protection for the low sensitivity of AFC, effected by trapping the sound IF carrier component in the IF amplifier 3.

The filter 29 is for trapping the picture IF carrier component in order to obtain AFC action by means of the output voltage of the discriminator 32 responsive only to the sound IF carrier signal.

The whole frequency characteristic of the main signal detecting circuit means 7 containing the filters 29 and 30 is illustrated in FIG. 2B.

Figure 2C:
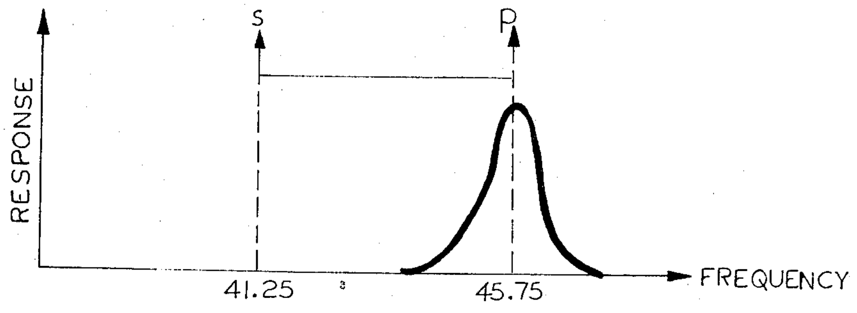
FIG. 2C is a graph showing the bandpass characteristic of the tuned amplifier in subsidiary detecting circuit means.

FIG. 2A illustrates the IF bandpass characteristics of a typical TV receiver used presently in the U.S.A., and FIG. 2C illustrates the frequency response of the tuned amplifier 36 for comparison with FIG. 2B.

Figure 3:
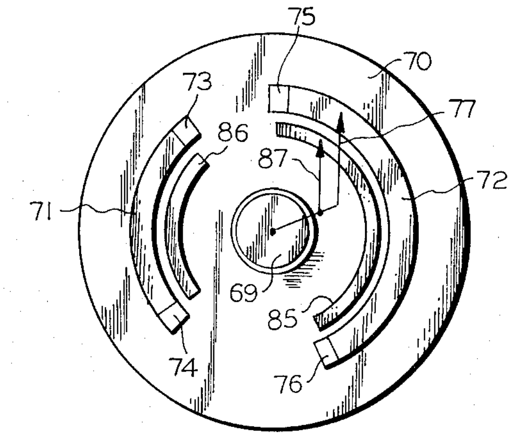
FIG. 3 is a diagram of an internal arrangement of a variable resistor with a switching means.
Figure 4:
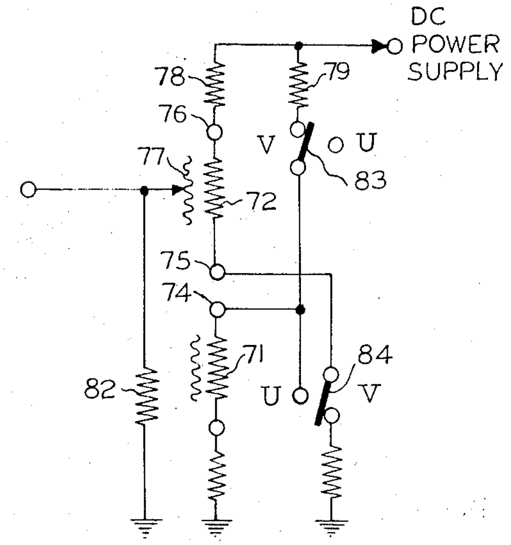
FIG. 4 is a circuit diagram showing the connection of a scanning circuit means with said variable resistor.

Referring to FIG. 3, the arrangement of the variable resistor 18 and the switching means 19 in the scanning means 12 is illustrated schematically for explaining the function thereof in detail together with FIGS. 4 and 5.

Two resistance elements 71 and 72, which are semicircular types, are positioned on a substrate 70 and have terminals 73 and 74, and 75 and 76, respectively.

A slider 77 in contact with the resistance elements is rotated by a shaft 69. The switch means 19 is arranged adjacent to and coaxially with the variable resistor 18, and has the same axis as that of the variable resistor 18. A slider 87 is rotated while remaining in contact with two contacts 85 and 86 which are shaded in FIG. 3.

FIG. 4 is a circuit diagram of an embodiment of the scanning means using the variable resistor as shown in FIG. 3, wherein the components corresponding to those in FIG. 3 are designated by the same reference numerals.

In FIG. 4, a voltage having a saw-tooth shape appears at the terminal 77 depending on the amount of rotation of the axis, as shown in FIG. 5B. The resistance element 71 is for scanning the frequency band in a low frequency channel. The resistors 78 and 79 limit the higher ends of the bias voltage for the voltage capacitance diodes, and the resistors 80 and 81 limit the lower ends thereof.

The switches 83 and 84 are the band selecting switches. When the switches are at a VHF band position, the voltage appearing at the terminal 77 which is to be applied to the tuning means changes as shown in FIG. 5B according to the movement of the shaft 69, and the voltage at a UHF band position is as shown in FIG. 5C. Since the switch means 19, arranged as shown in FIG. 3, is the power switch for the tuning means, D.C. power is supplied to the tuning means only when the slider contact 87 contacts the contacts 85 and 86 to supply power as at (a) and (b) in FIG. 5A.

Accordingly, the tuning means is not supplied with DC power during the return time from the end of scanning at the low channel to the start of scanning at the high channel in the VHF band or from the end of scanning at the high channel to the start of scanning at the low channel, and the same in the UHF band.

Therefore, according to this invention, erroneous tuning will not occur. However, even when using the switching means 19, there is a problem of inaccurate tuning.

Referring again to FIG. 4, there is provided a resistor 82 connected between the slider terminal 77 of the variable resistor 18 and ground, and it is used for compensating the nonlinearity of the relation between the tuning frequency and the bias voltage of the variable-capacitance diode.

If the compensating resistor 82 is not provided, the bias voltage for the variable capacitance diodes 14 and 16 is applied, as shown in FIG. 5B, during tuning in the VHF band. Consequently, the tuned frequency is scanned, as shown in FIG. 6A, because the variable capacitance diode usually has a non-linear relationship between the capacitance and the bias voltage. However, there is a problem in that the control signals have pulses of different shapes between the lower and the higher portions within the same band (i.e. the pulse-widths of the signals are different), and consequently the stopping position of the IF carrier signals within the IF bandpass characteristic differs, and so accuracy of tuning is not assured.

The resistor 82 is provided for overcoming the above defects. When the resistor 82 is provided, the bias voltage applied to the variable capacitance diode is changed from that as shown in FIG. 5B to that as shown in FIG. 5D. Accordingly, the scanned frequency is changed from that as shown in FIG. 6A to that as shown in FIG. 6B. The resistance value of the resistor 82 depends on the particular variable capacitance diode which is used.

Thus, by means of a very simple circuit connection, i.e. the inserting of the resistor 82, the relation between the tuned frequency and the rotational position of the variable resistor can be compensated so as to be linear, and, accordingly, much more accurate tuning is assured.

A switching element 50 is coupled to the sound intermediate frequency amplifier 6 to control its action. When supplied with the output voltage of the bistable multivibrator 43, the element 50 stops the operation of the sound intermediate amplifier 6 during the signal scanning period. Accordingly, a viewer is not disturbed by noisy sounds during the signal scanning period.

What is claimed is:

1. In a signal seeking type auto-tuning television receiver having a tuning means including a reversely biased voltage variable capacitance diode in a signal selection circuit and which converts a selected television signal to picture and sound intermediate frequency signals, an intermediate frequency amplifier which is coupled to said tuning means and is provided with a predetermined band pass characteristic within which said picture and sound carrier signals are correctly converted to intermediate frequency signals, a stable D.C. power supply, and a sound intermediate frequency amplifier, the combination comprising:

- a scanning means coupled to said tuning means, said scanning means having means for supplying a sweep voltage to said voltage variable capacitance diode for scanning through the frequency spectrum of a television band;
- a driving means coupled to said scanning means for driving said scanning means;
- a control circuit means coupled to said driving means for controlling said driving means;
- a main signal detecting circuit means connected with said IF amplifier, said means including a limiter having a filtering circuit for rejecting undesired signal components and further including a frequency discriminator having a resonant circuit tuned to a first predetermined frequency for detecting sound IF carrier signals which are in said predetermined frequency and for developing a main control signal at the output of said frequency discriminator;
- a subsidiary signal detecting means connected in parallel with said main signal detecting circuit means, said means including a tuned amplifier tuned to a second predetermined frequency, a detector coupled to said tuned amplifier and having a resonant circuit tuned to a synchronizing signal frequency for detecting the picture IF carrier signal at said second predetermined frequency, and a rectifier connected with said detector through said resonant circuit and for developing a subsidiary control signal;
- a gate circuit means connected between said main signal detecting means and said control circuit means, said means being controlled by said subsidiary control signal for feeding said main control signal to said control circuit means; and a mechanical switching means coupled to said control circuit means, said control circuit means starting and stopping a signal seeking action through an action of said driving means according to the operation of said mechanical switching means and developing said main and subsidiary control signals.

2. The combination as claimed in claim 1 wherein said gate circuit means comprises an active element having an output terminal connected between said main signal detecting means and said control circuit means and an input terminal connected with an output terminal of said subsidiary signal detecting means, and the output conductance of said active element is controlled by said subsidiary control signal applied to said input terminal for feeding said main control signal to said control circuit means only when said subsidiary control signal is present.

3. The combination as claimed in claim 1 wherein said control circuit means comprises a bistable multivibrator and a switching circuit means coupled thereto, and said bistable multivibrator actuates said switching circuit means for starting or stopping said driving means.

4. The combination as claimed in claim 1 wherein said scanning means comprises a variable resistor and a switching means, said variable resistor comprising a substrate, at least one semi-circular resistance element on said substrate, a first resistor connected between one terminal of the resistance and the stable D.C. power supply, and a second resistor connected between the other terminal of the resistance and ground, a shaft, and a slider fixed on said shaft and contacting said resistance element and having a terminal connected to said voltage variable capacitance diode in said tuning means, whereby said voltage capacitance diode is reversely biased by a voltage related to the rotational position of said shaft, and said switching means consisting of another slider fixed on said shaft and rotated together with said slider of said variable resistor, a further substrate, and at least one metallic electrode on said further substrate and having a similar shape to said resistance element, said switching means being connected between said D.C. power supply and said tuning means for supplying D.C. power to said tuning means only when said slider of said variable resistor contacts said semi-circular resistance element and for activating said tuning means only during the aforesaid time interval.

5. The combination as claimed in claim 4 wherein said variable resistor in said scanning means has two semi-circular resistance elements arranged opposite each other on the substrate for scanning a low and high TV channel in the VHF band, respectively, said resistance elements each having two terminals and being connected to the D.C. power supply and ground through resistors, respectively, and said switching means having two semi-circular metallic electrodes.

6. The combination as claimed in claim 1 wherein said frequency discriminator in said main signal detecting circuit has two output terminals, one of said two output terminals being for said main control signal and said frequency discriminator developing a signal for automatic frequency control at the other of said output terminals, the other output terminal being coupled to said tuning means.

7. The combination as claimed in claim 1 further comprising a switching element which is coupled to said control circuit means, said control circuit means having a bistable multivibrator, said switching element being controlled by an output voltage of said bistable multivibrator of said control circuit means and being coupled to the sound intermediate frequency amplifier for controlling the action of said sound intermediate frequency amplifier so that sound amplification is stopped during a signal seeking period.

* * * * *